United States Patent
Acquistapace et al.

(10) Patent No.: US 9,970,581 B2
(45) Date of Patent: May 15, 2018

(54) MANUAL CONNECTION FOR CONNECTING TWO FLUID DUCTS

(71) Applicant: BOCCARD, Villeurbanne (FR)

(72) Inventors: Bruno Acquistapace, Seyssel (FR); Jason Vanston, Oullins (FR); Patrick Boccard, Villeurbanne (FR)

(73) Assignee: BOCCARD, Villeurbanne (FR)

( * ) Notice: Subject to any disclaimer, the term of this patent is extended or adjusted under 35 U.S.C. 154(b) by 0 days. days.

(21) Appl. No.: 14/767,323

(22) PCT Filed: Feb. 10, 2014

(86) PCT No.: PCT/FR2014/050250
§ 371 (c)(1),
(2) Date: Aug. 12, 2015

(87) PCT Pub. No.: WO2014/125199
PCT Pub. Date: Aug. 21, 2014

(65) Prior Publication Data
US 2015/0377397 A1    Dec. 31, 2015

(30) Foreign Application Priority Data
Feb. 12, 2013    (FR) ..................... 13 51165

(51) Int. Cl.
*F16L 37/18* (2006.01)
*F16L 37/10* (2006.01)
(Continued)

(52) U.S. Cl.
CPC .............. *F16L 37/18* (2013.01); *F16L 21/03* (2013.01); *F16L 37/101* (2013.01); *F16L 37/107* (2013.01); *F16L 37/20* (2013.01)

(58) Field of Classification Search
CPC ........ F16L 37/107; F16L 37/20; F16L 37/101
(Continued)

(56) References Cited

U.S. PATENT DOCUMENTS

| 397,187 | A | * | 2/1889 | Holton et al. | .......... F16L 37/20 285/311 |
| 491,299 | A | * | 2/1893 | Vogt | ........................ F16L 37/18 285/312 |

(Continued)

FOREIGN PATENT DOCUMENTS

| EP | 0813016 A1 | 12/1997 |
| FR | 1602038 A | 9/1970 |

OTHER PUBLICATIONS

May 15, 2014 International Search Report issued in International Patent Application No. PCT/FR2014/050250.
(Continued)

*Primary Examiner* — David E Bochna
(74) *Attorney, Agent, or Firm* — Oliff PLC

(57) ABSTRACT

A manual connection includes: a first connection element having two holding parts; a second connection element having two clamping bodies that can be moved rotatably and between a clamping position wherein each clamping body cooperates with a holding part for fixing the first connection element in the second connection element, and a release position wherein each clamping body releases a respective holding part; and control device for moving each clamping body between the clamping and release positions. The control device is designed such that the rotation of a clamping body is carried out about a rotational direction orthogonal to the longitudinal direction. The control device includes a grip body connected to each clamping body so as to rotate the two clamping bodies.

16 Claims, 4 Drawing Sheets

(51) Int. Cl.
  *F16L 37/107* (2006.01)
  *F16L 37/20* (2006.01)
  *F16L 21/03* (2006.01)

(58) Field of Classification Search
  USPC .................................... 285/312, 87, 88, 93
  See application file for complete search history.

(56) References Cited

U.S. PATENT DOCUMENTS

| | | | | |
|---|---|---|---|---|
| 939,931 A * | 11/1909 | Towle | ............... | F16L 37/48 285/312 |
| 949,608 A * | 2/1910 | Watt | ............... | F16L 37/18 285/312 |
| 1,304,653 A * | 5/1919 | Booth | ............... | F16L 37/48 285/312 |
| 1,481,392 A * | 1/1924 | Schawrow | ............ | F16L 37/16 285/312 |
| 1,639,813 A * | 8/1927 | Schawrow | ............ | F16L 37/16 285/148.19 |
| 2,222,746 A * | 11/1940 | Kamenarovic | ....... | B60T 17/043 137/614.05 |
| 2,951,717 A | 9/1960 | Zaber | | |
| 3,116,943 A * | 1/1964 | Wagner | ............ | F16L 37/16 285/312 |
| 3,278,207 A * | 10/1966 | Barish | ............... | A61G 13/10 285/312 |
| 3,502,298 A * | 3/1970 | Paddington | ............ | F16K 1/22 137/614.06 |
| 3,860,274 A | 1/1975 | Ledstrom et al. | | |
| 4,103,712 A * | 8/1978 | Fletcher | ............... | F16L 37/107 137/614.06 |
| 4,575,130 A * | 3/1986 | Pemberton | ............ | F16L 37/18 141/349 |
| 5,026,099 A * | 6/1991 | Hendrix | ............... | F16L 37/138 285/87 |
| 5,507,530 A * | 4/1996 | Mahaney | ............... | F16L 37/56 285/312 |
| 5,535,984 A * | 7/1996 | Anderson | ............... | F16L 37/20 285/312 |
| 5,575,510 A * | 11/1996 | Weh | ............... | F16L 37/18 285/312 |
| 6,290,267 B1 | 9/2001 | Swingley | | |
| 6,505,861 B2 * | 1/2003 | Butterfield | ............... | F16L 27/08 285/312 |
| 7,520,538 B2 * | 4/2009 | McGushion | ............ | F16L 37/05 285/312 |
| 2011/0240136 A1 * | 10/2011 | Trottier | ............... | B67D 7/54 137/15.01 |

OTHER PUBLICATIONS

Aug. 18, 2015 International Preliminary Report on Patentability issued in International Patent Application No. PCT/FR2014/050250.

May 15, 2014 Written Opinion issued in International Patent Application No. PCT/FR2014/050250.

\* cited by examiner

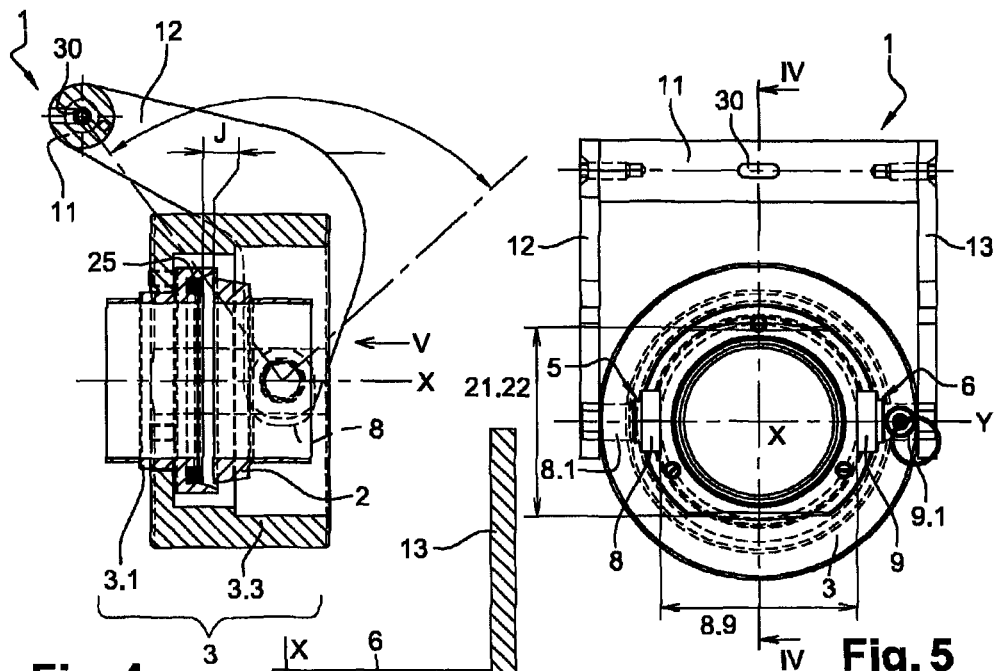
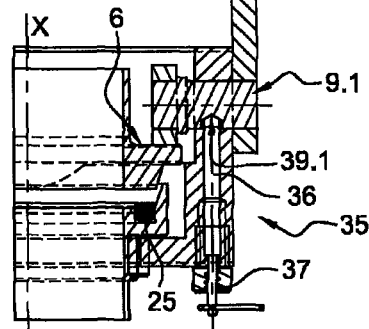
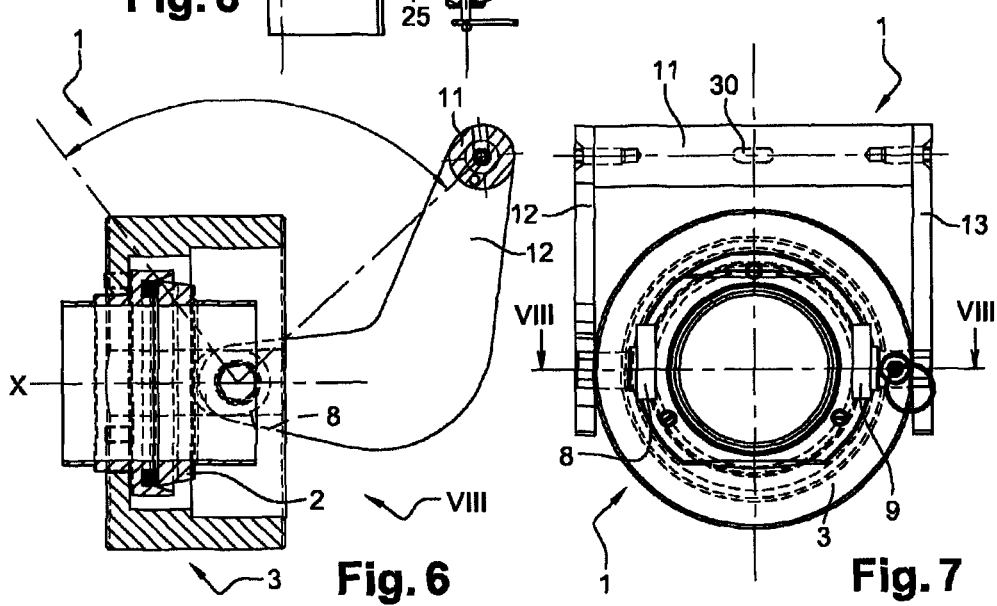

MANUAL CONNECTION FOR CONNECTING TWO FLUID DUCTS

BACKGROUND

The present invention relates to a manual connection for connecting two ducts intended to drive fluid, such as a liquid under pressure.

The present invention may apply to any industrial field requiring a manual connection, with repeated opening and closing, for the transfer of fluids. Particularly, the present invention may apply to dismountable circuits such as flexible pipes or fluid bridges. Particularly, the present invention may apply to the liquid-processing, cosmetics, biology and fine chemicals fields.

U.S. Pat. No. 3,860,274A or U.S. Pat. No. 6,290,267A discloses a widespread manual connection which has a male element with two retaining parts and a female element receiving the first connection element. The second connection element includes two cams disposed in the second connection element and displaceable in rotation between a tightening position, where they collaborate with the retaining parts, and a loosening position, where they release the retaining parts. The manual connection of U.S. Pat. No. 386,027A or U.S. Pat. No. 6,290,267A comprises two gripping members, in the form of levers, which are configured to respectively and independently displace the tightening cams between the tightening position and the loosening position. When an operator activates one of the gripping members, the corresponding tightening cam rotates around a direction of rotation which is tangential with the female element, hence to its fluid passage section.

However, the arrangement of the tightening cams makes it necessary for the operator to carry out at least two successive maneuvers in order to tighten the manual connection of U.S. Pat. No. 386,027A or U.S. Pat. No. 6,290,267A. In fact, the operator must turn a gripping member in order to tighten a tightening cam, then he/she must turn the other gripping member in order to tighten the other tightening cam. Hence, the manual connection of U.S. Pat. No. 386,027A or U.S. Pat. No. 6,290,267A induces relatively long manual connections, thereby slowing down the industrial production, particularly in the case where the manual connections to be maneuvered are numerous like for a fluid bridge.

SUMMARY

The present invention aims in particular to resolve, entirely or partially, the aforementioned issues.

To this aim, the object of the invention is a manual connection, for connecting two ducts intended to drive fluid, such as a fluid under pressure, the manual connection comprising:
- a first connection element including at least two retaining parts;
- a second connection element suitable for receiving the first connection element along a longitudinal direction, the second connection element including at least two tightening members disposed in the second connection element, each tightening member being able to be displaced at least according to a rotation and between a tightening position, in which each tightening member collaborates with a respective retaining part in such a manner as to fasten the first connection element in the second connection element, and a loosening position, in which each tightening member releases a respective retaining part; and
- handling means configured for displacing each tightening member between the tightening position and the loosening position;

the manual connection characterized in that the handling means are configured in such a manner that the rotation of a respective tightening member is carried out around a direction of rotation which is orthogonal to the longitudinal direction; and in that the handling means comprise a gripping member suitable to be gripped by the operator, for example a handle, the gripping member being linked to each tightening member in such a manner that actuating the gripping member by the operator, for example pivoting, rotationally drives the two tightening members.

Thus, such a manual connection allows a rapid connection of the ducts by an operator with one single hand and without the aid of tools. In fact, the gripping member allows the operator to turn the two tightening members simultaneously and with one movement. When each tightening member compresses a respective retaining part, the first connection element is plated against the second connection element, thus allowing creating a seal between them. Thus, as the connection of the first connection element and the second connection element is sealed in tightening position, the fluid can flow in the ducts through the manual connection without leakage hazard.

In the present application, the term "link" and its derivatives designate a direct or indirect kinematic link, between two pieces. Such a kinematic link may be achieved by means of none, of one or of several component(s).

In the present application, the verbs "connect", "couple", "supply" and their derivatives relate to the fluidic communication of at least two remote volumes, in order to allow a flow of fluid between these two remote volumes. This flow of fluid may be carried out by means of none, of one or of several component(s).

Particularly, the manual connection object of the present invention may be used in order to rapidly connect two ducts intended to drive liquid, that is to say, any product comprising a liquid phase and capable of flowing in a hydraulic duct, such as a liquid, a mixture of several liquids, a mixture of liquid and gas or a mixture of liquid and solid particles also known by "slurry".

In the present application, the term "releasing" and its derivatives designate the possibility for the operator to clear the first connection element out of the second connection element.

According to a variant of the invention, each direction of rotation is secant to a fluid passage section defined by the second connection element. Thus, the gripping member may have a simple and compact structure. For example, in the case where the second connection element defines a cylindrical passage section with a circular base, each direction of rotation may be collinear with a diameter of this circular base.

According to a variant of the invention, the tightening members are respectively located on two sides of the second connection element which are opposite each other with respect to the longitudinal direction. For example, in the case where the second connection element defines a cylindrical passage section with a circular base, the tightening members are diametrically opposed.

According to an embodiment of the invention, each retaining part is formed by a respective shoulder disposed outwardly protruding on the first connection element.

Thus, such shoulders allow carrying out the retaining parts in a simple manner, each shoulder defining a surface oriented in parallel with the longitudinal direction and which may be compressed by a respective tightening member.

In the present application, the term "inner" qualifies a surface oriented towards the passage of the fluid in the first connection element, whereas the terms "outer" qualifies a surface oriented in the opposite direction.

According to a variant of the invention of this embodiment, each shoulder is disposed outwardly protruding on a proximal portion of the first connection element. Thus, as soon as the operator introduces the first connection element in the second connection element, the shoulders reach the location they occupy when the tightening members are in tightening position.

In the present application, a portion of the first connection element is qualified by "proximal" when it is near the second connection element in tightening position. Likewise, a portion of the second connection element is qualified by "proximal" when it is near the first connection element in tightening position. Conversely, a first portion of the first connection element is qualified by "distal" when it is far from the second connection element in tightening position, and a portion of the second connection element is qualified by "distal" when it is far from the first connection element in tightening position.

According to an embodiment of the invention, the first connection element has on its outer surface at least two introduction portions defining a transversal dimension, measured orthogonally to the longitudinal direction, which is less than the distance separating the two tightening members, in such a manner that the second connection element may be pivotally displaced around the longitudinal direction between:
- an introduction position, in which the introduction portions may slide between the tightening members in such a manner as to introduce the first connection element in the second connection element in translation along the longitudinal direction; and
- a retaining position, in which the retaining parts are respectively in abutment against the tightening members in such a manner as to retain the first connection element in the second connection element.

In other words, the first connection element follows a trajectory similar to that of a bayonet when the operator introduces it in the second connection element then places it in retaining position. Thus, contrary to the manual connection of U.S. Pat. No. 3,860,274A or U.S. Pat. No. 6,290,267A, the first connection element may be retained or locked in the second connection element, when the tightening members are in loosening position, thus preventing, in the event of unexpected loosening, a bursting and a major leak of the manual connection as a result of the pressure of the fluid. In fact, in retaining position, there is only one small clearance between the first connection element and the second connection element, hence a small leakage rate in the event of incident.

According to a variant of the invention, each retaining part is secured to the first connection element, for example integrally with the first connection element. Thus, the retaining parts may withstand high tightening forces and their manufacture may be simple when they are integral with the first connection element.

According to a variant of the invention, the second connection element comprises a casing and an end piece secured to the casing, the end piece being placed in the casing and defining an inner surface configured for channeling the fluid. Thus, the casing may receive all or part of the first connection element. Advantageously, the end piece is placed in the casing.

This construction allows protecting the connecting area between the first connection element and the second connection element, in particular a seal member, against external mechanical (impacts) or chemical (corrosion) attacks.

According to an embodiment of the invention, the first connection element has a flange, preferably located on a proximal portion of the first connection element, the contour of the flange defining the retaining parts, the introduction parts being formed in the flange.

Thus, the rim of such a flange defines a plurality of retaining parts, thus allowing the operator to easily place the retaining parts in contact with the tightening members over a large angular range around the longitudinal direction.

According to an embodiment of the invention, each tightening member comprises an eccentric cam with an external curvilinear, preferably convex, profile.

Thus, such eccentric cams allow exerting great tightening forces for a small rotation movement, thus making very swift the displacement of the loosening position to the tightening position.

According to a variant of the invention, the eccentric cams are disposed in the second connection element, preferably on an internal surface of said casing. Thus, the eccentric cams may be displaced without risking interfering or colliding with an object external to the manual connection.

According to a variant of the invention, each tightening member comprises two connecting rods arranged in such a manner that a rotation of the handling means induces a demultiplied rotation of each tightening member.

According to an embodiment of the invention, the directions of rotation of the two tightening members are parallel, preferably collinear, and the tightening members are arranged in order to rotate in the same direction of rotation.

Thus, such collinear directions of rotation simplify the construction of the manual connection, particularly of the gripping member and its mechanical links to the tightening members.

According to an embodiment of the invention, the first connection element and the second connection element define, in tightening position, a channel globally having the form of a cylinder, preferably with a circular base, the longitudinal direction being collinear with the axis of said cylinder.

Thus, such a passage channel forms a highly hygienic manual connection, as it prevents detachments, hence retentions, of the fluid.

According to an embodiment of the invention, the handling means comprise two levers arranged for respectively pivoting around directions of rotation, the levers being linked, preferably in a stationary manner, to the gripping member.

Thus, such levers provide the operator with a lever arm, thus limiting the manual force for tightening the manual connection.

According to an embodiment of the invention, the manual connection further comprises an elastically deformable seal member, arranged in such a manner as to create a sealing connection between a first gasket surface defined by the first connection element and a second gasket surface defined by the second connection element, the seal member, the tightening members and the first and second gasket surfaces being configured in such a manner that the seal member is flush with the wet surfaces of the first connection element and second connection element when each tightening member is in tightening position.

Thus, such a flush seal member allows forming a manual connection which is not soiling, hence highly hygienic, as the seal member does not retain particles of the fluid flowing in the manual connection.

In the present application the term "wet surface" designates any surface of contact with the fluid when the manual connection is in service. The wet surfaces are thereby inner surfaces of the manual connection.

According to a variant of the invention, the seal member is partially housed in a throat of the second connection element.

According to a variant of the invention, the seal member is composed of a material selected from the group consisting of silicone, of ethylene propylene diene monomer (EPDM), of nitrile butadiene rubber (NBR) and of polytetrafluoroethylene (PTFE). Thus, such a material is resistant to the mechanical constraints caused by the tightening and chemical constraints caused by the fluid.

According to a variant of the invention the first connection element and the second connection element are configured in such a manner as to channel a fluid, for example a liquid, under a pressure higher than 5 bars, for example equal to 10 bars. The materials and dimensions of the first and second connection elements may be selected in order to withstand such a fluid pressure. Thus, the manual connection may withstand high pressures.

According to an embodiment of the invention, the manual connection further comprises at least a detection device comprising an active detector, preferably selected from the group constituted of a camera, a magnetic-inductive sensor, an inductive sensor and a radio frequency identification antenna, the detection device further comprising a passive element, for example a tag for radio frequency identification, the active detector being configured for generating a signal when each tightening member is in tightening position.

Thus, such a detection device allows preventing connection errors, particularly in the case where the detection device communicates with an automation controlling the flow of fluid in the ducts.

According to an embodiment of the invention, the active detector is secured to the first connection element and the passive element is carried by the second connection element.

According to a variant of this embodiment, the passive element is a tag for radio frequency identification housed in the gripping member and the active detector is a radio frequency identification antenna disposed on the first connection element, the distance between the tag for radio frequency identification and the radio frequency identification antenna being lower than the detection distance when the gripping member, hence each member, is in tightening position.

Thus, such a detection device allows detecting the tightening position in a reliable manner. Some detection devices, such as radio frequency identification technology, allows recording information on the manual connection, that is to say, read and/or write certain information, such as the sanitary state of the manual connection (clean, dirty, sterile), its operational state (non used, being used, being cleaned) and its history (date of first use, last fluid transferred, time of the previous cleaning) etc. Some information are invariable and are only intended to be read, such as the serial number of the manual connection, the materials thereof, the manufacturing date thereof, etc. whereas other information can be modified, automatically (date and time of the previous cleaning for example), or manually (date of replacement of the seal member for example).

According to an embodiment of the invention, the manual connection further comprises a locking device arranged for locking the rotation of at least one tightening member.

Thus, such a locking device increases the safety of the manual connection, as it prevents unexpected loosening.

According to a variant of this embodiment, the locking device comprises a lock pin and an elastic return member, the lock pin being able to be manually displaced between a locking position, in which the lock pin partially penetrates in a cavity arranged in an axis secured in rotation of one of the tightening members, and an unlocking position, in which the lock pin is cleared from the cavity, the elastic return member being arranged in order to return the lock pin to a locking position.

According to a variant of the invention, the manual connection further comprises a locking member arranged to lock the rotation of the gripping member. Thus, such a locking member increases the safety of the manual connection, as it prevents unexpected loosening.

According to a variant of the invention, the first connection element and the second connection element are composed of a stainless steel. Thus, the manual connection is resistant to chemical corrosion.

The above-mentioned embodiments and variants may be taken alone or according to any technically admissible combination.

BRIEF DESCRIPTION OF THE DRAWINGS

The present invention will be better understood and its advantages will become apparent in light of the following description, given only by way of non limiting example with reference to the accompanying drawings, in which:

FIG. 4 is a section, along plane IV of FIG. 2;

FIG. 5 is a front view along the arrow V on FIG. 4;

FIG. 6 is a section along plane VI of FIG. 3 or along line IV-IV on FIG. 5;

FIG. 7 is a front view, along the arrow VII on FIG. 6;

FIG. 8 is a half-section along line VIII-VIII of FIG. 7;

DETAILED DESCRIPTION

Figure 1:
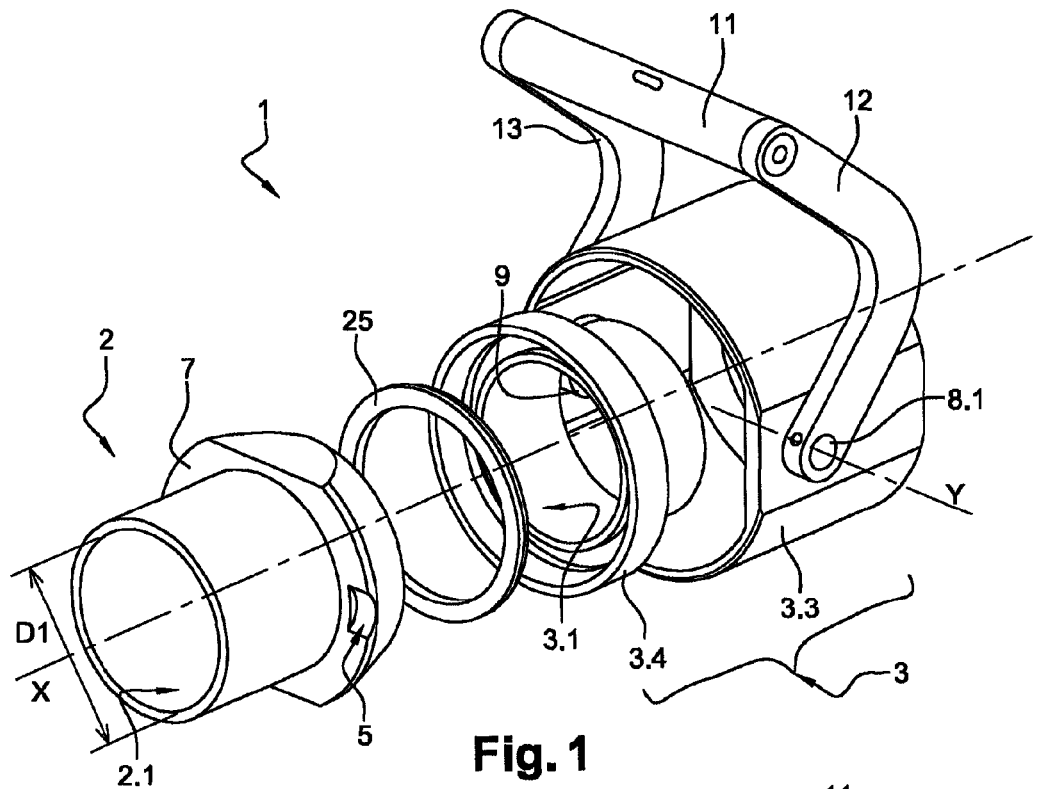
FIG. 1 is an exploded perspective view of a manual connection in accordance with a first embodiment of the invention.

FIGS. 1, 2, 3, 4, 5, 6, 7, 8 and 9 illustrate a manual connection 1, intended to connect two non represented ducts of fluid. In this instance, the fluid may be a liquid under pressure by around 10 bars. The manual connection 1 comprises a first connection element 2 and a second connection element 3, which is suitable for receiving the first connection element 2 along a longitudinal direction X. The first connection element 2 and the second connection element 3 are here composed of stainless steel.

In the example of FIGS. 1 to 8, the first connection element 2 has an inner cylindrical surface 2.1 the function of which is to channel the liquid. Similarly, the second connection element 3 has an inner cylindrical surface 3.1 the function of which is to channel the liquid.

When the manual connection 1 is in service, that is to say, in tightening configuration, the inner surface 2.1 coincides with the inner surface 3.1 in such a manner that the first connection element 2 and the second connection element 3 define, in tightening configuration, a channel which globally has the form of a cylinder with a circular base, of which the axis is collinear with the longitudinal direction X.

In service, the liquid coming from an upstream duct is channeled towards a downstream duct by the inner surface 2.1 and the inner surface 3.1. The manual connection 1 here has an inner diameter D1, materialized on FIG. 1 on the inner surface 2.1, of around 50 mm.

The second connection element 3 is here composed of a casing 3.3 and an end piece 3.4 secured together. The end piece 3.4 is placed in the casing 3.3. The inner surface 3.1 is defined by the end piece 3.4.

The first connection element 2 includes two retaining parts 5 and 6, visible on FIGS. 1, 5 and 8. Each of the retaining parts 5 and 6 is here formed by a respective shoulder disposed outwardly protruding on a proximal portion 7 of the first connection element 2.

Figures 10, 11:
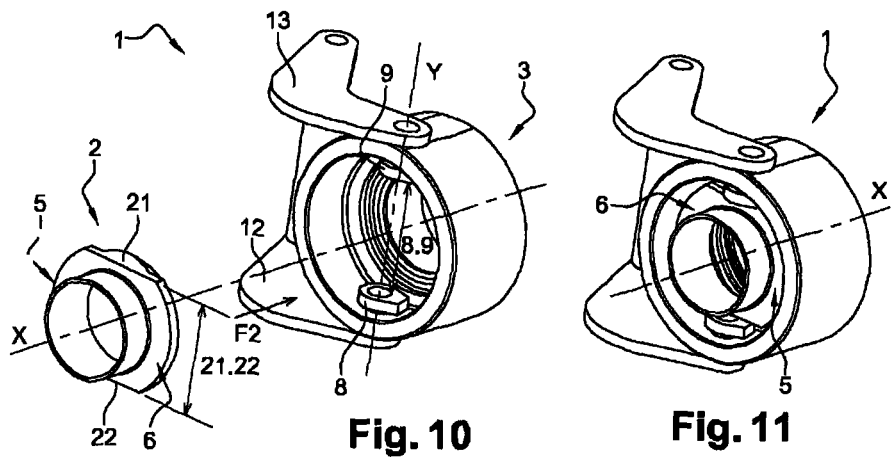
FIG. 10 is a perspective view, of the side opposite to FIG. 2, of the manual connection of FIG. 1 in a configuration prior to the connection, where the first connection element and the second connection element are separate.
FIG. 11 is a view similar to FIG. 10 of the manual connection of FIG. 10, during the introduction of the first connection element in the second connection element.

The second connection element 3 includes two eccentric cams 8 and 9, visible on FIGS. 5, 7 and 10, which are similar and have a convex curvilinear external profile. Each of the eccentric cams 8 and 9 forms a tightening member configured for collaborating with a part of the respective retainer 5 or 6.

The eccentric cams 8 and 9 are here located respectively on two sides of the second connection element 3 which are opposite with respect to the longitudinal direction X. As the second connection element 3 has a globally cylindrical form with a circular base, the eccentric cams 8 and 9 are diametrically opposed.

The retaining part 5 is represented on FIG. 1 with a notch in the shoulder. However, this notch is optional, as a planar surface on the shoulder would be enough to obtain tightening of the tightening members 8 and 9 respectively on the retaining parts 5 and 6.

The retaining parts 5 and 6 are here located respectively on two sides of the first connection element 2 which are opposite with respect to the longitudinal direction X. As the first connection element 2 has a globally cylindrical form with a circular base, the retaining parts 5 and 6 are diametrically opposed.

The eccentric cams 8 and 9 are disposed in the second connection element 3, on an internal surface of the casing 3.3. Each of the eccentric cams 8 and 9 is displaceable according to a rotation and between:

a tightening position (FIG. 3), in which each of the eccentric cams 8 and 9 collaborates, by compression, with a respective retaining part 5 or 6 in such a manner as to fasten the first connection element 2 in the second connection element 3, and a loosening position (FIG. 2), in which each of the eccentric cams 8 and 9 releases a respective retaining part 5 or 6.

Figure 9:
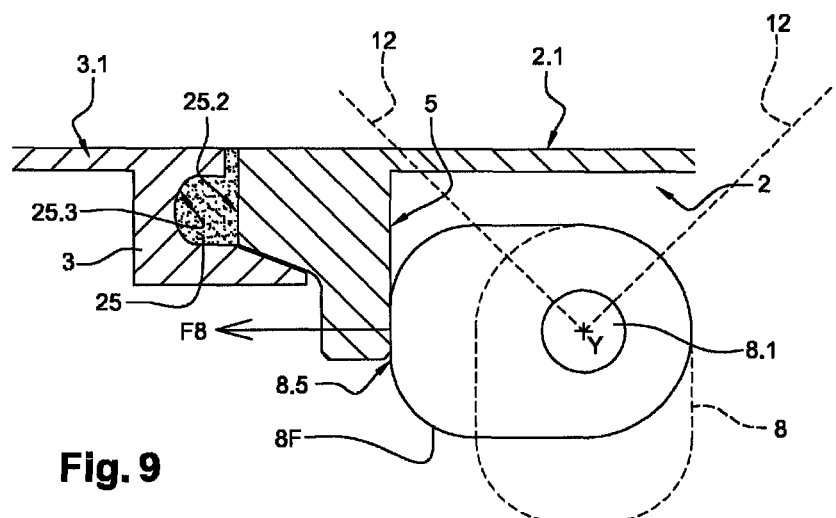
FIG. 9 is a schematic view of a part of the manual connection of FIG. 1, on a larger scale.

FIG. 9 shows the eccentric cam 8 in loosening position (dashes), and in tightening position (reference 8F). In tightening position, a pressure surface of the eccentric cam 8F exerts a force F8 on the retaining part 5 along the longitudinal direction X. The force F8 is the resultant pressure forces.

Figure 2:
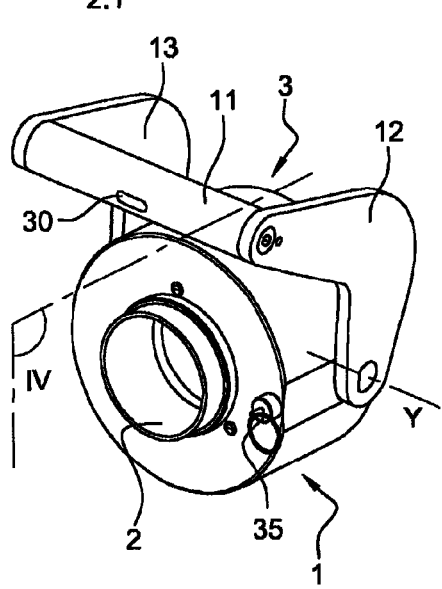
FIG. 2 is a perspective view of the manual connection of FIG. 1, in a loosening configuration.
Figure 3:
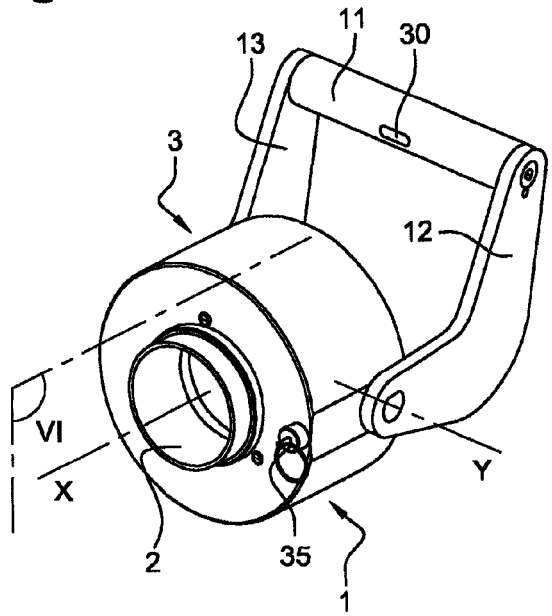
FIG. 3 is a perspective view of the manual connection of FIG. 1, in a tightening configuration.

The manual connection 1 further comprises handling means configured to displace each of the eccentric cams 8 and 9 between the tightening position (FIG. 3) and the loosening position (FIG. 2). This displacement is reversible, as each of the eccentric cams 8 and 9 may be displaced from the tightening position (FIG. 3) to the loosening position (FIG. 2), then from the loosening position (FIG. 2) to the tightening position (FIG. 3).

The handling means are configured in such a manner that the rotation of a respective eccentric cam 8 or 9 is carried out around a direction of rotation Y and over an angular range of around 90 degrees, as shown by the comparison of FIGS. 4 and 6. The direction of rotation Y is here perpendicular to the longitudinal direction X. In addition, the direction of rotation Y is secant to the fluid passage section defined by the second connection element 3. As shown on FIGS. 1, 2, 3, 5 and 10, the fluid passage section is here a globally circular section defined by the inner surface 3.1. In fact, the inner surface 3.1, as the inner surface 2.1 globally has the form of a cylinder with a circular base and with an axis which is collinear with the longitudinal direction X.

Furthermore, the handling means here comprise a handle 11 forming a gripping member suitable for an operator to grip. The handle 11 is linked to the eccentric cams 8 and 9 in such a manner that when the operator activates the handle 11, here by pivoting, the eccentric cams 8 and 9 are driven in rotation. In other words, one single movement on the part of the operator allows simultaneously displacing the eccentric cams 8 and 9. Contrary to the manual connection of U.S. Pat. No. 3,860,274A or U.S. Pat. No. 6,290,267A, the manual connection 1 comprises a unique gripping member for simultaneously displacing the tightening members 8 and 9.

In the example of FIGS. 1 to 8, each of the eccentric cams 8 and 9 is mounted on a respective axis 8.1 or 9.1, which is itself in a pivot link with the casing 3.3 of the second connection element 3. In other words, the respective axes 8.1 or 9.1 may pivot with respect to the second connection element 3, thus causing the rotations of the eccentric cams 8 or 9.

In the example of FIGS. 1 to 8, the directions of rotation of the eccentric cams 8 and 9 are collinear. In other words, the eccentric cams 8 and 9 rotate around a direction of rotation Y which is common to both of them. In addition, the eccentric cams 8 and 9 are here arranged for rotating in the same direction of rotation, with respect to the direction of rotation Y.

Alternatively, a variant of the invention may comprise eccentric cams or other tightening members which simultaneously rotate in opposite directions when the operator maneuvers the gripping member.

In addition, the handling means here comprise two levers 12 and 13 which are arranged to pivot respectively around the direction of rotation Y. The levers 12 and 13 are linked to the handle 11 in a stationary manner, for example by screw, rivet or welding. Alternatively, the levers may be linked to the handle 11 by a pivot link, thus allowing a free rotation of the handle 11 when the operator makes it pivot around the direction of rotation Y.

The levers 12 and 13 here provide the operator with a lever arm of around 100 mm, thus limiting the manual force to be provided for tightening the manual connection 1. In general, the lever arm depends on the inner diameter of the manual connection; typically, the lever arm measures around twice the inner diameter of the manual connection; for example, for an inner diameter of 100 mm, the lever arm would be around 200 mm.

Each of the levers 12 and 13 here has an elbow, thus reducing the size of the levers 12 and 13 for a given lever arm.

Figures 12, 13:
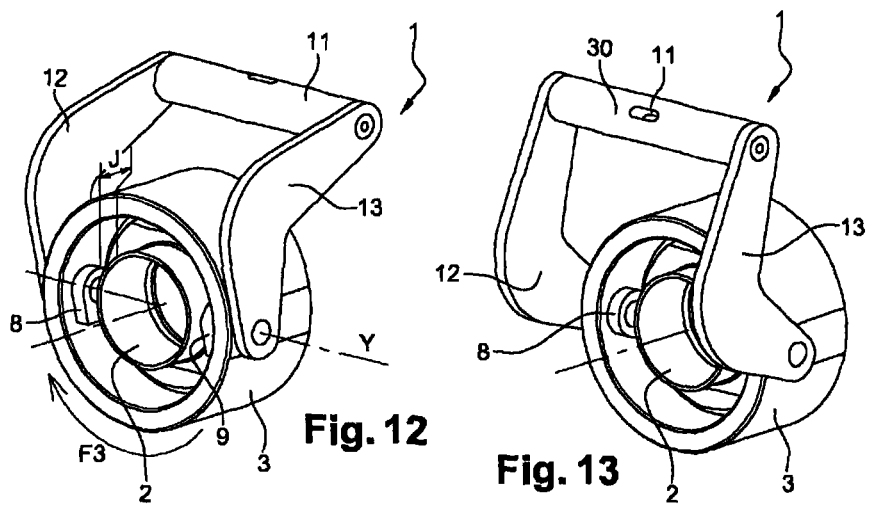
FIG. 12 is a view similar to FIG. 10 of the manual connection of FIG. 10 in a retaining configuration, in which the first connection element is retained in the second connection element.
FIG. 13 is a view similar to FIG. 10 of the manual connection of FIG. 10 in an intermediate configuration.

Furthermore, as FIGS. 5 and 12 show, the first connection element 2 has on its outer surface two introduction portions 21 and 22 which define a transversal dimension 21.22, measured orthogonally to the longitudinal direction X, which is lower than the distance 8.9 separating the eccentric cams 8 and 9, in such a manner that the second connection element 3 may be displaced by pivoting around the longitudinal direction X between:

an introduction position (FIGS. 10 and 11), in which the introduction portions 21 and 22 may slide between the eccentric cams 8 and 9 in such a manner as to introduce the first connection element 2 in the second connection element 3 in translation along the longitudinal direction X (or the second connection element 3 around the first connection element 2), a translation symbolized by the arrow F2 on FIG. 12;

a retaining position (FIGS. 4 and 12), in which the retaining parts are in abutment respectively against the eccentric cams 8 and 9 in such a manner as to retain the first connection element 2 in the second connection element 3.

The pivoting of the second connection element 3 between the introduction position (FIGS. 10 and 11) and the retaining position (FIGS. 4 and 12) is symbolized by the arrow F3 on FIG. 12. The comparison of FIGS. 11 and 12 allows viewing this pivoting. This pivoting extends over around 90 degrees.

In other words, during this pivoting of the second connection element 3, the first connection element 2 follows a trajectory similar to that of a bayonet when the operator places the second connection element 3 around the first connection element 2, then places them in retaining position (FIG. 12).

The first connection element 2 is hence retained, or locked, in the second connection element 3, when the eccentric cams 8 and 9 are in loosening position (FIGS. 2, 6, 7 and 12), thus preventing, in the event of unexpected loosening, a bursting and a major leakage of the manual connection 1 as a result of the liquid under pressure. In fact, in retaining position (FIG. 12), there is only a small clearance between the first connection element 2 and the second connection element 3, hence a small leakage rate in the event of incident. More particularly, this clearance, symbolized by the side J on FIG. 4 or 12, extends between each of the eccentric cams 8 and 9 and the flange of the first connection element 2.

According to a variant of the invention, each retaining part is secured to the first connection element, for example in an integral manner with the first connection element. Thus, the retaining parts may withstand great tightening forces and their manufacture may be simple when they are integral with the first connection element.

The first connection element 2 here has a flange forming the proximal part 7 of the first connection element 2. The contour of this flange defines the retaining parts 5 and 6. The introduction portions 21 and 22 are arranged on this flange. In the example of FIGS. 1 to 14, the introduction portions 21 and 22 are formed by flat spots truncated in the flange.

Thus, the rim of such a flange defines in fact a plurality of retaining parts, thus allowing the operator to easily place the retaining parts in contact with the eccentric cams 8 and 9 on a large angular range, around 90 degrees, around the longitudinal direction X.

In addition, the manual connection 1 comprises a seal member 25 which is elastically deformable. The seal member 25 is here composed of an ethylene propylene diene monomer (EPDM). The seal member 25 is here partially housed in a throat of the second connection element 3. As shown on FIG. 9, the seal member 25 is arranged in such a manner as to achieve a sealing connection between a first gasket surface 25.2 defined by the first connection element 2 and a second gasket surface 25.3 defined by the second connection element 3.

Figure 14:
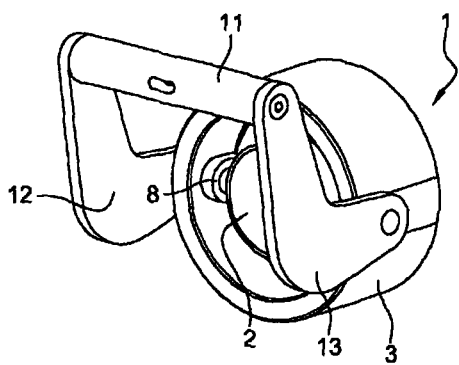
FIG. 14 is a view similar to FIG. 10 of the manual connection of FIG. 10 in a tightening configuration, in which the first connection element is retained in the second connection element.

In addition, the seal member 25, the eccentric cams 8 and 9 and the first 25.2 and second 25.3 gasket surfaces are configures in such a manner that the seal member 25 is flush with the inner surfaces 2.1 and 3.1, that is to say, the wet surfaces, of the first connection element 2 and the second connection element 3 when each of the eccentric cams 8 and 9 is in tightening position (FIGS. 3 and 14).

Furthermore, the manual connection 1 comprises an active detector non represented and a passive element 30 which form a detection device configured to generate a signal when each of the eccentric cams 8 and 9 is in tightening position (FIGS. 3 and 14). In the example of FIGS. 1 to 14, the passive element 30 comprises a tag for radio frequency identification (RFID) and the active detector comprises an radio frequency identification antenna and a source of energy electrically linked to the radio frequency identification antenna.

The passive element 30 is here accommodated in a housing arranged in the handle 11. On the other hand, the active detector is secured to the first connection element 2. For example, the active detector may be fastened directly on the first connection element 2, or on the duct to which is connected the first connection element 2, or even on a fluid bridge on which is mounted the first connection element 2.

The active detector regularly emits requests and receives a response from the passive element 30, when the passive element 30 is at a sufficient distance from the active detector, that is to say when each of the eccentric cams 8 and 9 is in tightening position (FIGS. 3 and 14).

As shown on FIG. 2 or 8, the manual connection 1 further comprises a locking device 35 which is arranged for locking the rotation of at least one eccentric cam 8 or 9, in such a manner as to prevent unexpected loosening. In the example of FIGS. 1 to 14, the locking device 35 comprises a lock pin 36 and an elastic return member formed by a spring 37 of helical form and working in compression.

The lock pin 36 is manually displaceable between:
a locking position (FIG. 8), in which the lock pin 36 partially penetrates in a cavity 39.1 arranged in the axis 9.1 secured in rotation to the eccentric cam 9, and
an unlocking position (not represented), in which the lock pin 36 is cleared from the cavity 39.1, the spring 37 being arranged to return the lock pin 36 to locking position (FIG. 8).

In use, when the liquid is not flowing in the ducts, an operator connects the upstream and downstream ducts by successively executing the steps illustrated on FIGS. 10 to 14:

First of all, the first connection element 2 is out of the second connection element 3 (FIG. 10).

Then, the operator introduces the first connection element 2 in the second connection element 3 (FIG. 11), for example by bringing the second connection element 3 around the first connection element 2 (translation according to arrow F2 to FIG. 12).

Then, the operator rotates the second connection element 3 by 90 degrees with respect to the first connection element 2 and around the longitudinal direction X (FIG. 12, arrow F3), thus bringing the manual connection 1 in retaining configuration, the eccentric cams 8 and 9 being in loosening position.

Then, the operator grips the handle 11 and makes it pivot by around 90 degrees in the direction of the first connection element 2 (FIG. 14), thus compressing the eccentric cams 8 and 9 respectively against the retaining parts 5 and 6 (tightening position).

During this pivoting, the connection becomes sealing in an intermediate configuration (FIG. 13). After this sealing connection, the liquid may flow in the ducts and through the manual connection 1.

Figure 15:
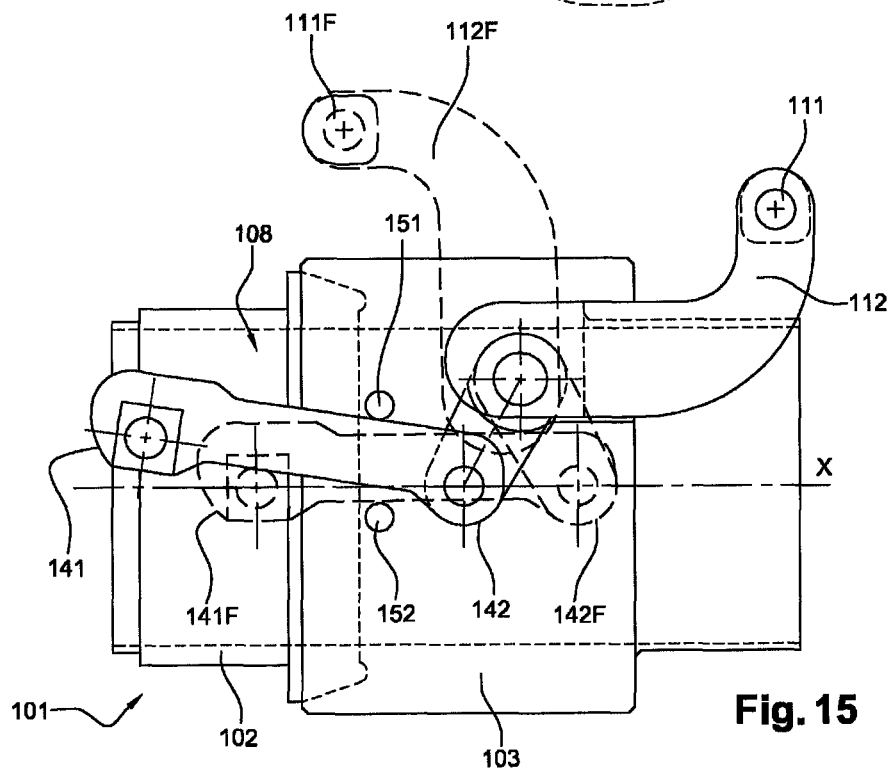
FIG. 15 is a schematic sectional view of a manual connection in accordance with a second embodiment of the invention.

The FIG. 15 illustrates a manual connection 101 in accordance with a second embodiment of the invention. In as far as the manual connection 101 is similar to the manual connection 1, the afore-given description of the manual connection 1 with regard to FIGS. 1 to 14 may be transposed to the manual connection 101, except for the differences stated hereinafter.

A manual connection element 101 identical or corresponding, by its structure or function, to a manual connection 1 bears the same numerical reference increased by 100. It is thus defined a first connection element 102, a second connection element 103, a handle 111, a lever 112, and two tightening members, of which one can be viewed with the reference 108. It is worth noting that FIG. 15 illustrates the tightening members 108 and equivalent both in tightening position (handle 111 on the right) and in loosening position (handle 111 on the left).

The manual connection 101 differs from the manual connection 1, as each of the tightening members 108 and equivalent comprises two connecting rods, namely a closing connecting rod 141 and a relay connecting rod 142. The closing connecting rod 141 and the relay connecting rod 142 are linked to the handle 111 and are arranged in such a manner that a rotation of the handle 111F induces a demultiplied rotation of each of the tightening members 108 and equivalent.

The reference of a component illustrated on FIG. 15 in tightening position bears the suffix letter "F" (111F, 141F, 142F), namely the handle 111F in tightening position, the closing connecting rod 141F in tightening position, the relay connection rod 142F.

The function of the closing connecting rod 141 is to compress non represented retaining parts of the first connection element 102. The function of the relay connecting rod 142 is to mechanically link the closing connecting rod 141 to the handle 111.

In addition, each of the tightening members 108 and equivalent comprises two bearings 151 and 152 and equivalent for limiting the movements towards the top and towards the bottom of the closing connecting rod 141.

The invention claimed is:

1. A manual connection, for connecting two ducts intended to drive fluid, the manual connection comprising:
a first connection element, including at least two retaining parts;
a second connection element, configured for receiving the first connection element along a longitudinal direction, the second connection element including at least two tightening members disposed in the second connection element, each tightening member being able to be displaced at least according to a rotation and between a tightening position, in which each tightening member collaborates with a respective retaining part in such a manner as to fasten the first connection element in the second connection element, and a loosening position, in which each tightening member releases a respective retaining part;
a handle configured for displacing each tightening member between the tightening position and the loosening position; and
a locking device arranged for locking the rotation of at least one tightening member,
wherein the manual connection is such that the handle is configured in such a manner that the rotation of a respective tightening member is carried out around a direction of rotation which is orthogonal to the longitudinal direction; and
wherein the handle comprises a gripping member configured to be gripped by an operator, the gripping member being linked to each tightening member in such a manner that actuating the gripping member by the operator, rotationally drives the two tightening members,
wherein the locking device comprises a lock pin and an elastic return member, the lock pin being capable of being manually displaced between a locking position, in which the lock pin partially penetrates in a cavity arranged in an axis secured in rotation of one of the tightening members, and an unlocking position, in which the lock pin is cleared from the cavity, the elastic return member arranged in order to return the lock pin to a locking position, and
wherein the first connection element has on its outer surface at least two introduction portions defining a transversal dimension, measured orthogonally to the longitudinal direction, which is less than the distance separating the two tightening members, in such a manner that the second connection element may be pivotally displaced around the longitudinal direction between:
an introduction position, in which the introduction portions may slide between the tightening members in such a manner as to introduce the first connection element in the second connection element in translation along the longitudinal direction; and
a retaining position, in which the retaining parts are respectively in abutment against the tightening members in such a manner as to retain the first connection element in the second connection element.

2. The manual connection according to claim 1, wherein each retaining part is formed by a respective shoulder disposed outwardly protruding on the first connection element.

3. The manual connection according to claim 1, wherein the first connection element has a flange, the contour of the flange defining the retaining parts, the introduction portions being formed in the flange.

4. The manual connection according to claim 3, wherein said flange is located on a proximal portion of the first connection element.

5. The manual connection according to claim 1, wherein each tightening member comprises an eccentric cam with an external curvilinear profile.

6. The manual connection according to claim 5, wherein the curvilinear profile is convex.

7. The manual connection according to claim 1, wherein the directions of rotation of the two tightening members are parallel, and wherein the tightening members are arranged in order to rotate in the same direction of rotation.

8. The manual connection according to claim 1, wherein the first connection element and the second connection element define, in tightening position, a channel having the form of a cylinder, the longitudinal direction being collinear with the axis of said cylinder.

9. The manual connection according to claim 8, wherein the said cylinder has a circular base.

10. The manual connection according to claim 1, wherein the handle comprise two levers arranged to respectively pivot around directions of rotation, the levers being linked to the gripping member.

11. The manual connection according to claim 1, wherein said levers are linked in a stationary manner to the gripping member.

12. The manual connection according to claim 1, further comprising an elastically deformable seal member, arranged in such a manner as to create a sealing connection between a first gasket surface defined by the first connection element and a second gasket surface defined by the second connection element, the seal member, the tightening members and the first and second gasket surfaces being configured in such a manner that the seal member is flush with wet surfaces of the first connection element and second connection element when each tightening member is in tightening position.

13. The manual connection according to claim 1, further comprising at least a detection device comprising an active detector, the detection device further comprising a passive element, the active detector being configured for generating a signal when each tightening member is in tightening position.

14. The manual connection according to claim 13, wherein said active detector is selected from the group constituted of a camera, a magnetic-inductive sensor, an inductive sensor and a radio frequency identification antenna.

15. The manual connection according to claim 13, wherein the active detector is secured to the first connection element and wherein the passive element is carried by the second connection element.

16. The manual connection according to claim 13, wherein the active detector is one of a camera, a magnetic inductive sensor, an inductive sensor and a radio frequency identification antenna, and the passive element is a tag for radio frequency identification.

* * * * *